United States Patent [19]
Smith et al.

[11] Patent Number: 4,766,359
[45] Date of Patent: Aug. 23, 1988

[54] ABSOLUTE SHAFT POSITION SENSING CIRCUIT

[75] Inventors: Geoffrey M. Smith, Reisterstown, Md.; Eric J. Stacey, Penn Hills Township, Allegheny County, Pa.

[73] Assignee: Westinghouse Electric Corp., Pittsburgh, Pa.

[21] Appl. No.: 27,468

[22] Filed: Mar. 18, 1987

[51] Int. Cl.$^4$ .............................................. G05B 1/06
[52] U.S. Cl. ..................................... 318/652; 318/603; 318/608; 318/314; 318/326
[58] Field of Search ............... 318/652, 603, 602, 606, 318/608, 684, 318, 314, 309, 310, 311, 312, 326, 653, 654, 661; 340/347 SY

[56] References Cited

U.S. PATENT DOCUMENTS

| | | | |
|---|---|---|---|
| 3,895,365 | 7/1975 | Freed | 340/195 |
| 3,906,327 | 9/1975 | O'Callaghan | 318/603 |
| 4,061,950 | 12/1977 | Kayanuma | 318/314 |
| 4,216,419 | 8/1980 | van Dam et al. | 318/318 |
| 4,223,261 | 9/1980 | White | 318/721 |
| 4,295,171 | 10/1981 | Hirota et al. | 318/603 X |
| 4,298,948 | 11/1981 | Davis | 364/603 |
| 4,310,787 | 1/1982 | Seeger et al. | 318/608 X |
| 4,364,002 | 12/1982 | Suzuki et al. | 318/603 X |
| 4,429,267 | 1/1984 | Veale | 318/603 X |
| 4,546,293 | 10/1985 | Peterson et al. | 318/254 |

*Primary Examiner*—William M. Shoop, Jr.
*Assistant Examiner*—Patrick C. Keane
*Attorney, Agent, or Firm*—R. P. Lenart

[57] ABSTRACT

An absolute shaft position sensing circuit uses a magnetic sensor and a toothed wheel to produce two pulse trains which are used to determine the absolute position of a shaft which is coupled to the toothed wheel. One pulse train includes regularly spaced pulses which are fed to a phase locked loop to produce an oscillating output signal. A counter counts this signal and produces an output count which is representative of the relative angular position of the shaft. A second pulse train includes an irregularly spaced pulse. Circuitry is provided to detect the occurrence of this irregularly spaced pulse and to reset the counter in response to that occurrence, thereby making the count representative of the absolute angular position of the shaft.

9 Claims, 5 Drawing Sheets

ABSOLUTE SHAFT POSITION SENSING CIRCUIT

BACKGROUND OF THE INVENTION

This invention relates to electronic circuits for determining the position of a rotating shaft and more particularly to such circuits which are suitable for use in aircraft power generating systems wherein the rotating shaft is the shaft of a dynamoelectric machine which is capable of operating as a generator or a motor.

In airborne electrical power generation systems, it is desirable to have a single system which provides both the starter and generator functions. The weight savings on an airplane can be substantial when a dedicated starter is eliminated. For this reasin, electrical power systems which are capable of providing engine start functions can provide both cost and weight savings.

Variable speed constant frequency (VSCF) power generation systems are commonly used for aircraft applications. One type of VSCF system includes a variable speed generator which supplies DC power to a pair of DC link conductors. An inverter circuit receives DC power from the link conductors and produces a constant frequency AC output. The inherent simplicity and reliability of DC link VSCF systems has been established and it is desired to modify the existing designs to provide starter capability.

DC link converters commonly utilize a transistor bridge output circuit having a pair of series connected transistors in each output phase leg adapted to be connected between the DC link conductors, wherein a connection point between the transistors serves as an output power pole. One method used to convert such a DC link VSCF system to a starter/generator system includes the use of a contactor or set of contactors to turn the system around so that an external electrical power source supplies the inverter input power and the generator is connected to the inverter as a load. In order to drive the generator as a synchronous motor, the absolute position of the rotor shaft must be known so that the inverter output transistors can be switched at the appropriate times to provide the desired motor action.

Since aircraft generators operate at 20,000 rpm at 225° C. with oil spray cooling, a rugged and reliable shaft position sensor is required. Common shaft position determining components such as resolvers, optical encoders, brush encoders and potentiometers will not survive in the harsh generator environment. A magnetic sensor/gear combination can provide a highly reliable position signal in such adverse environments. However, such systems provide relatively low resolution, do not provide relevant data at zero speed and do not known absolute position initially. It is therefore desirable to construct an absolute shaft position sensing circuit which includes a magnetic sensor/gear combination which overcomes these disadvantages.

SUMMARY OF THE INVENTION

A shaft position sensing circuit constructed in accordance with this invention includes means for generating a first pulse train having a plurality of regularly spaced pulses occurring at a frequency which is representative of the speed of rotation of an associated shaft. Means for generating a second pulse train is also provided wherein the second pulse train has a plurality of regularly spaced pulses and at least one irregularly spaced pulse which occurs once for each rotation of the shaft. A phase locked loop which includes a voltage controlled oscillator is connected to produce a first signal having a frequency which is representative of but greater than the frequency of pulses in the first pulse train. A counter receives this signal and produces an output count which is representative of the relative angular position of the shaft. Means is provided for detecting the occurrence of the irregularly spaced pulse in the second pulse train and for resetting the counter in response to the occurrence of this irregularly spaced pulse, thereby making the output count representative of the absolute angular position of the shaft.

The preferred embodiment uses a magnetic sensor/gear combination to produce the first and second pulse trains. The position sensor works on the principal of variable reluctance. The sensor produces a magnetic field adjacent to the ferromagnetic gear such that as an edge of each gear tooth approaches, the reluctance of the field path changes and a voltage spike is produced. Opposite polarity voltages occur for opposite edges of the gear tooth. By making at least one of the gear teeth wider than the others, the irregularly spaced pulse occurs when one of the edges of the wider tooth passes the magnetic sensor.

DESCRIPTION OF THE PREFERRED EMBODIMENT

Figure 1:
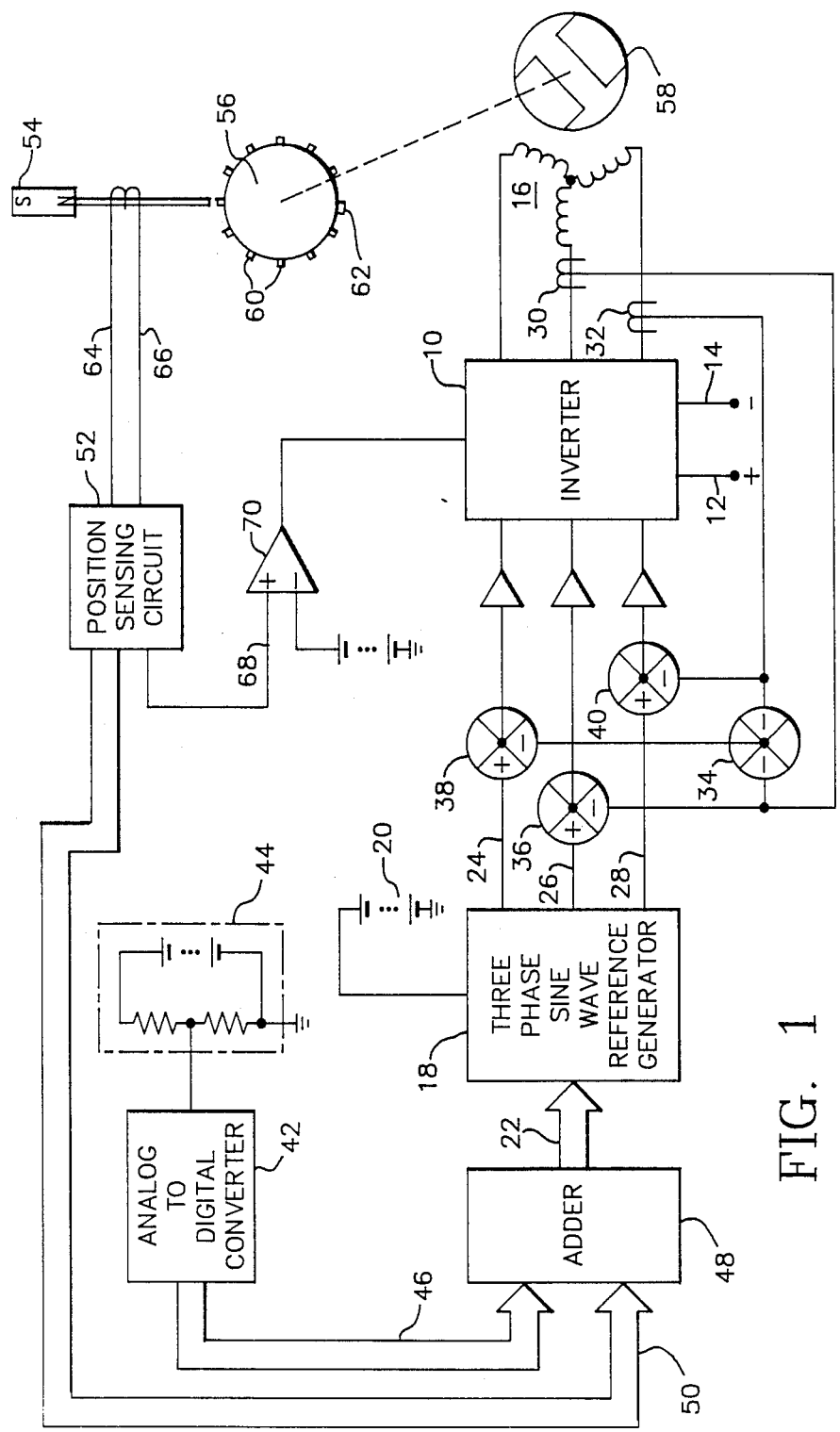
FIG. 1 is a schematic diagram of a starter/generator system which includes the position sensing circuit of the present invention.

Referring to the drawings, FIG. 1 is a schematic diagram of an aircraft electrical generating system which has been configured to provide a starting function. An inverter 10 that normally receives DC power on a pair of DC link conductors 12 and 14 from a dynamoelectric machine 16 which is operated as a generator and receives power from an associated aircraft engine, has been switched around to supply power to the dynamoelectric machine 16 thereby operating it as a starter motor for the associated aircraft engine. For this mode of operation, some other electrical power source, not shown, such as another power generating system or a ground power source is connected to supply power to DC link conductors 12 and 14. A three-phase sine wave reference generator 18 is connected to a reference voltage 20 and receives rotor position data on data bus 22 to produce a plurality of inverter switching waveforms on lines 24, 26 and 28. In order to obtain maximum torque, stator current is controlled with respect to the shaft position information. Current sensors 30 and 32 provide current feedback signals which are used to modify the switching pattern waveforms on lines 24, 26 and 28 by way of summing junctions 34, 36, 38 and 40.

An analog-to-digital converter 42 is connected to a reference voltage source 44 to provide a signal on data bus 46 which is representative of a fixed angle which is added to the rotor position. This fixed angle is added by way of adder 48 to a signal on data bus 50 which represents the absolute position of the rotor shaft. The present invention particularly relates to the position sensor circuit 52 as used in combination with a magnetic sensing device 54 and a wheel 56 connected to rotate with shaft 58 of the dynamoelectric machine 16. The wheel includes a plurality of peripheral teeth 60 with at least one of the teeth 62 being configured to produce an irregularly spaced pulse on the input lines 64 and 66 of the position sensor circuit as that tooth passes the magnetic sensor 54. The position sensor circuit 52 also provides a speed indicating signal on line 68 which is fed to a comparator 70 to provide a trip function for the inverter if the speed of the dynamoelectric machine becomes excessive.

Figure 2:
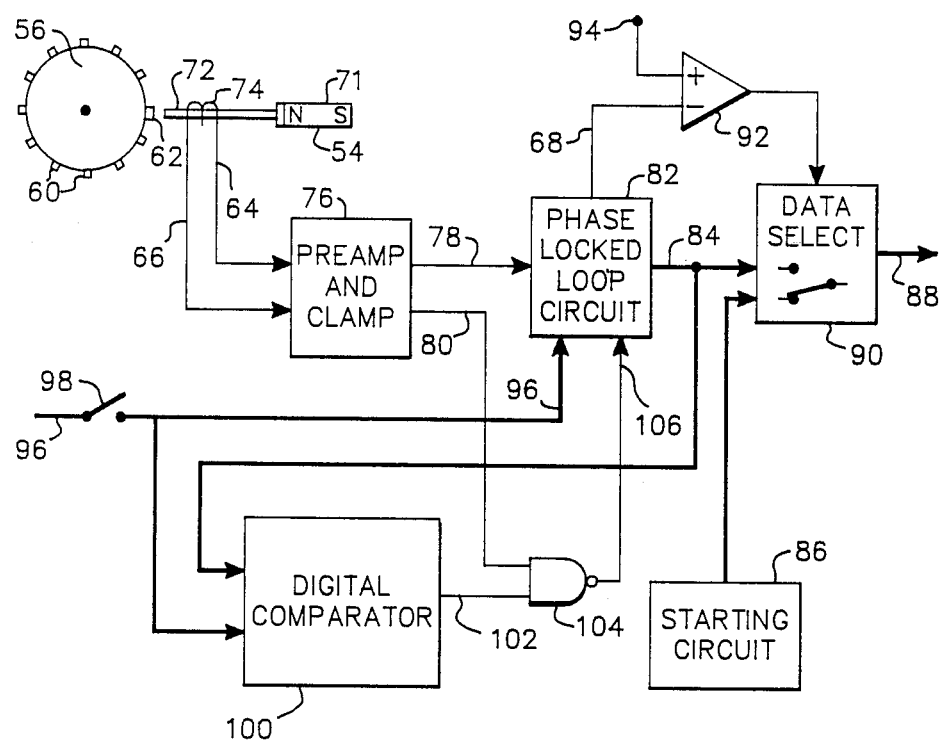
FIG. 2 is a block diagram of a position sensing circuit constructed in accordance with one embodiment of the present invention.

FIG. 2 illustrates a block diagram of a portion of the position sensor circuit 52 in FIG. 1. In this drawing, and in FIG. 6, the heavy dark lines represent multiple conductor data buses. The magnetic sensor used in this preferred embodiment is shown to include a permanent magnet 71 which is connected to a ferromagnetic shaft 72 that is positioned adjacent to the teeth of the toothed wheel 56. A pick-up coil 74 is responsive to changes in the reluctance of the associated magnetic circuit to produce voltage pulses as the edges of the teeth pass the shaft 72. The leading edges of the teeth produce a first pulse train, containing regularly spaced pulses of a first polarity. The trailing edges of the teeth produce a second pulse train. Since at least one of the teeth 62 is wider than the others, the trailing edge of that tooth produces an irregularly spaced pulse which may be referred to as a misplaced pulse. A pre-amp and clamp circuit 76 receives the first and second pulse trains and produces a first output signal $V_{REG}$ on line 78 which is representative of the pulses of the first pulse train and a second voltage signal $V_{IRREG}$ on line 80 which is representative of the pulses of the second pulse train. A phase locked loop circuit 82 is responsive to the first voltage $V_{REG}$ and produces an output data signal which is representative of the rotor angle $\theta_R$ on data bus 84. During initial start up of the dynamoelectric machine, an external starting circuit 86 produces a simulated rotor position signal which is coupled to data bus 88 by way of a plurality of data select switches 90. A comparator 92 which is connected to receive an external speed reference signal on terminal 94 and an indication of the actual rotor speed on line 68 from the phase locked loop circuit, controls the data select switches 90 so that once a preselected speed has been achieved, data bus 84 is connected to data bus 88 and the starting circuit 86 is disconnected. A position select circuit, shown in FIG. 6, is used to provide preset data by way of data line 96 to the phase locked loop circuit. A plurality of switches 98, only one of which is shown, also connect this preset data to a digital comparator 100. When both the $V_{IRREG}$ signal on line 80 and the digital comparator output on line 102 are at a logic high level, NAND gate 104 provides a reset signal by way of line 106 to the phase locked loop circuit 82. The operation of this circuit is described in greater detail with respect to FIGS. 5 and 6.

Figure 3:
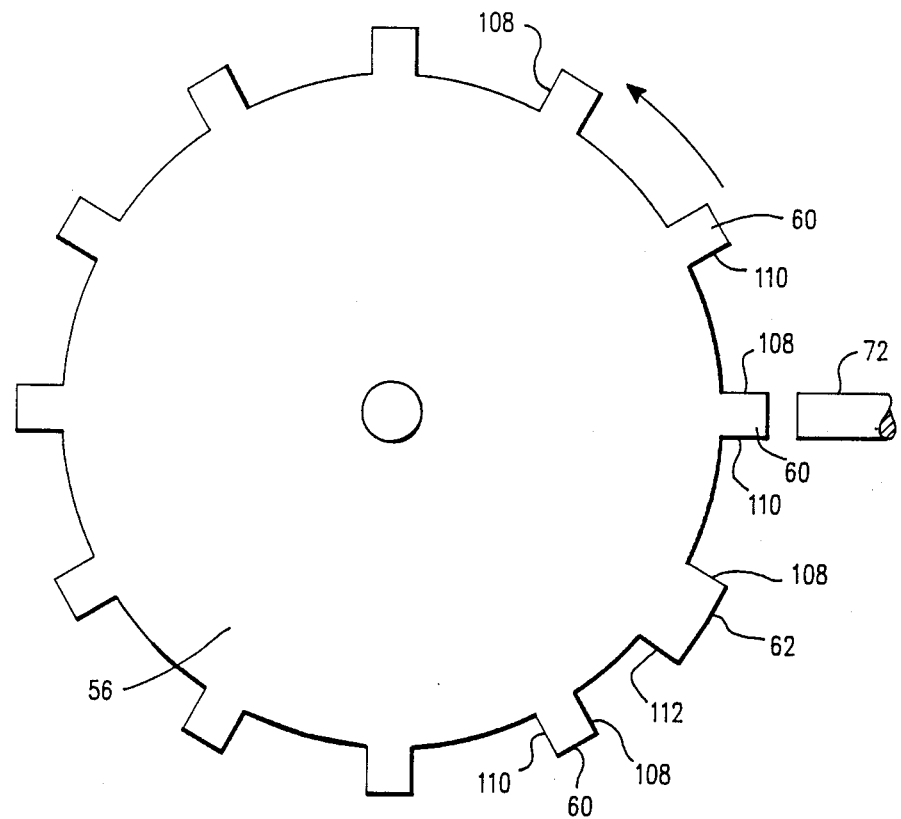
FIG. 3 is a schematic representation of a toothed wheel/sensor assembly used to provide the pulse trains required by the circuit of the present invention.
Figure 4:
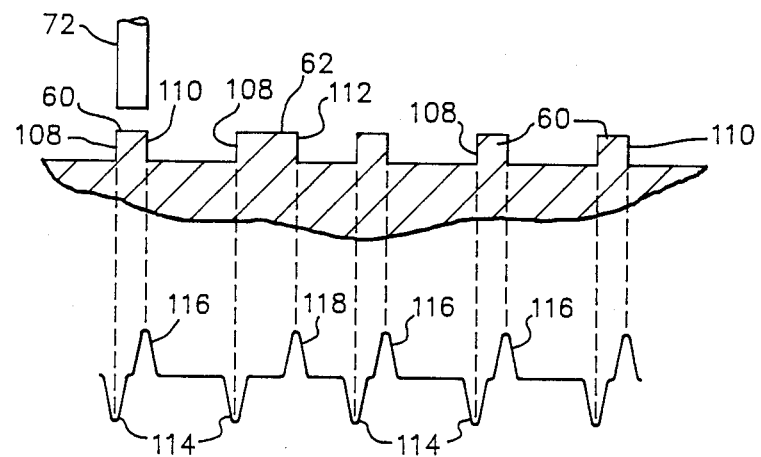
FIG. 4 is a schematic representation of the pulses produced by the wheel/sensor assembly of FIG. 3.

FIG. 3 is a schematic representation of the ferromagnetic toothed wheel 56 and the adjacent sensor shaft 72. Each of the teeth on the periphery of the wheel is shown to include a first edge 108. These first edges are regularly spaced around the periphery of the wheel such that as they pass sensor shaft 72, for a given speed, they produce a first pulse train which includes a plurality of regularly spaced pulses at a first polarity. Each of these teeth also includes a second edge 110 or 112. The majority of the second edges 110 are also regularly spaced around the wheel periphery. However, at least one of the second edges 112 is irregularly spaced. The wider tooth 62 is thereby used as a keying tooth for determining the absolute position of the associated rotor shaft. The irregularly spaced second edge 112 of the keying tooth 62 causes a misplaced pulse which is irregularly spaced with respect to the pulses produced by the second edges of the other wheel teeth. The operation of the toothed wheel/sensor is illustrated in FIG. 4. As the toothed wheel passes the sensor shaft 72, the first or leading edges of each tooth produce a first pulse train having a plurality of negatively going pulses 114 which are regularly spaced. Similarly, the trailing edge of each tooth produces a pulse train having a plurality of positively going, regularly spaced pulses 116 and one misplaced pulse 118 which corresponds to the trailing edge 112 of the wider tooth 62.

Figure 5:
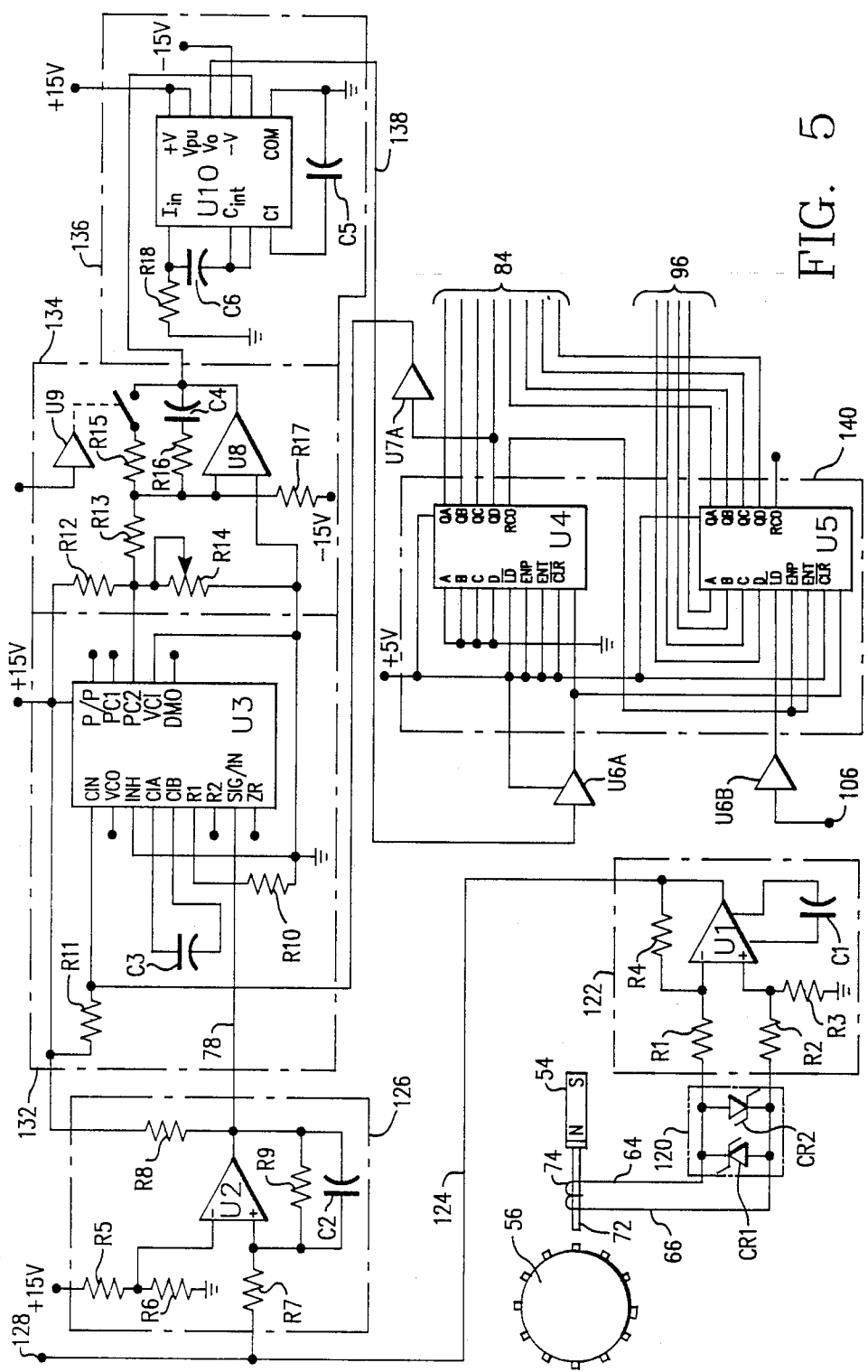
FIG. 5 is a schematic diagram of the magnetic sensor signal conditioning circuitry of the present invention.
Figure 6:
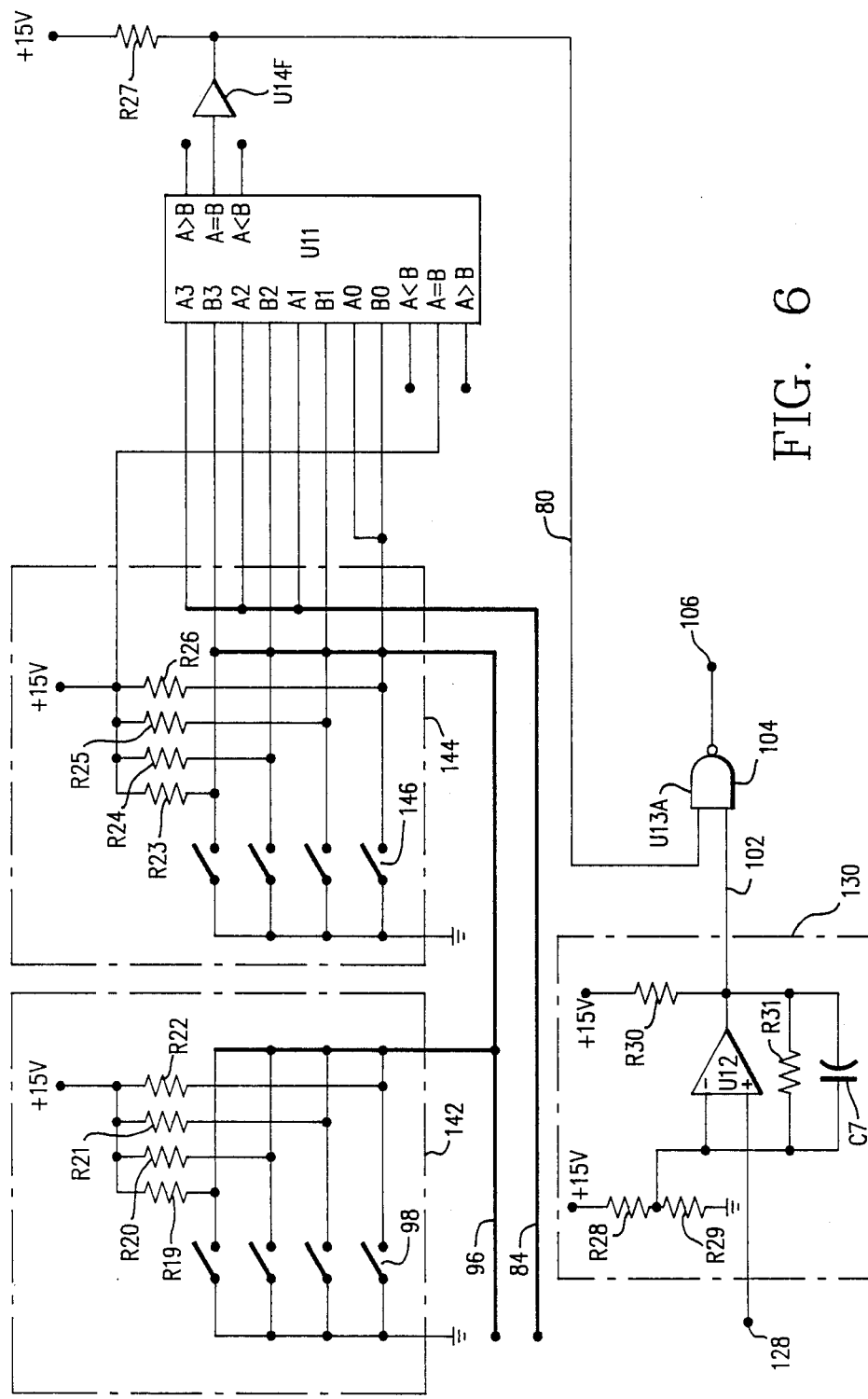
FIG. 6 is a schematic diagram of the absolute position sensing circuitry of the present invention.

FIG. 5 is a schematic diagram of the magnetic sensor signal conditioner and phase locked loop which have been constructed in accordance with one embodiment of the present invention. The pulse trains produced by the sensing coil 74 include pulses having a magnitude which increases with speed. Therefore, these pulses are fed to a clamp circuit 120 which limits the voltage magnitude of the pulses delivered to a pre-amp circuit 122. The output of the pre-amp on line 124 is fed to a first comparator 126 which produces a voltage $V_{REG}$ on line 78. The pre-amp output is also fed by way of terminal 128 to a second comparator 130 illustrated in FIG. 6. The $V_{REG}$ signal is fed to a phase lock loop circuit which comprises a phase lock loop 132, a filter 134 and a voltage controlled oscillator 136. The voltage controlled oscillator frequency is 16 times the phase lock loop input frequency. The voltage controlled oscillator output is fed by way of line 138 to an 8-bit counter 140 which includes two counting circuits U4 and U5. By using a voltage controlled oscillator which has an output frequency that is larger than the input frequency to the phase locked loop circuit, the resolution of the position sensing scheme is improved. Within counter 140, the four most significant bit counter U5 output represents the position of each tooth on the toothed wheel. The four least significant bit counter U4 output defines the position of the toothed wheel between each tooth.

FIG. 6 shows that a plurality of switches 98 are used in an absolute position select circuit 142 to produce the required reset data on data bus 96. A keyed position select circuit 144 uses a plurality of switches 146 to produce a reference set of bits which represent the position of the keying pulse. These keying pulse bits are compared to the four least significant bits from position counter U4 by digital comparator U11. Comparator circuit 130 produces an output signal on line 102 which is representative of the second pulse train such that when the irregularly spaced pulse occurs, a signal from the output of NAND gate 104 on terminal 106 resets counter U5 in FIG. 5 with data from bus 96 which represents the true position of the keying tooth. Therefore, the output of counter circuit 140 is then representative of the absolute position of the shaft being measured.

In order to provide a more detailed illustration of the preferred embodiment, Table I includes a list of components used to construct the circuits of FIGS. 5 and 6.

TABLE I

Components in FIGS. 5 and 6

| Component | Type/Value |
| --- | --- |
| U1 | CA3140A |
| U2, U12 | LM311 |
| U3 | 4046 |
| U4, U5 | 74163 |
| U6 | 4050 |
| U7, U14 | 7407 |
| U8 | HI-281 |
| U9 | CA3140 |
| U10 | VFC62 |
| U11 | 7405 |
| U13 | 4011 |
| C1 | 12 pF |
| C2, C7 | 100 pF |
| C3 | 50 pF |
| C4 | 0.22 μF |
| C5 | 300 pF |
| C6 | .001 μF |
| CR1, CR2 | IN985 |
| R1, R2, R9, R13, R31 | 100KΩ |
| R3, R4, R17 | 200KΩ |
| R5, R16, R28 | 15KΩ |
| R6, R7, R29 | 1.5KΩ |
| R8, R19-R25, R30 | 2KΩ |
| R10 | 10KΩ |
| R11, R27 | 5.1KΩ |
| R12 | 2.4KΩ |
| R14 | 5KΩ |
| R15 | 510Ω |
| R18 | 39KΩ |

The present invention uses a gear/magnetic sensor in a simple absolute shaft position sensing circuit which can be used in high speed, high temperature, high vibration and oily environments. Interface circuitry is used to condition the sensor output and to determine the absolute shaft position. A phase locked loop provides resolution beyond that of the gear teeth. Although the present invention has been shown in terms of what is at present believed to be its preferred embodiment, it will be apparent to those skilled in the art that various changes may be made without departing from the scope of the invention. It is therefore intended that the appended claims cover such changes.

What is claimed is:

1. A shaft position sensing circuit comprising:
    means for generating a first pulse train having a plurality of regularly spaced pulses occurring at a frequency representative of the speed of rotation of a shaft;
    means for generating a second pulse train having a plurality of regularly spaced pulses and at least one irregularly spaced pulse, said irregularly spaced pulse occurring once for each rotation of said shaft;
    phase locked loop having a voltage controlled oscillator for producing a first signal having a frequency which is representative of but greater than the frequency of pulses in said first pulse train;
    a counter for producing an output count in response to said first signal, said count being representative of the relative angular position of said shaft;
    means for detecting the occurrence of said irregularly spaced pulse in said second pulse train; and
    means for resetting said counter in response to the occurrence of said irregularly spaced pulse, thereby making said output count representative of the absolute angular position of said shaft.

2. A circuit as recited in claim 1, wherein:
    said means for generating a first pulse train includes a toothed wheel mounted for rotation with said shaft and a magnetic sensor positioned adjacent to said toothed wheel, each tooth on said wheel having a first edge positioned such that the passage of said first edges past said sensor produces the pulses of said first pulse train; and
    said means for generating a second pulse train includes said toothed wheel and said sensor wherein each tooth on said wheel has a second edge, at least one of said second edges being irregularly spaced with respect to other ones of said second edges, such that the passage of said second edges past said sensor produces the pulses of said second pulse train.

3. A circuit as recited in claim 1, wherein:
    the pulses of said first pulse train are of a first polarity; and
    the pulses of said second pulse train are of a second polarity.

4. A circuit as recited in claim 1, wherein said means for detecting comprises:
    an analog comparator for comparing said second pulse train with a first predetermined voltage level and for producing a first logic signal in response to the occurrence of said irregularly spaced pulse.

5. A circuit as reicted in claim 4, wherein said means for resetting comprises:
    a digital comparator for comparing said output count with a preselected number and for producing a second logic signal when said output count equals said preselected number; and
    means for producing a reset signal in response to said first and second logic signals.

6. A shaft position sensing circuit comprising:
    a wheel connected in a driving relationship with a rotatable shaft;
    said wheel having a plurality of peripheral teeth, each of said teeth having a first and second edge, wherein said first edges are equally spaced, a plurality of said second edges are equally spaced and at least one of said second edges is irregularly spaced with respect to said plurality of said second edges;
    a magnetic sensor positioned adjacent to said wheel for producing a first pulse train in response to the passage of said first edges past said sensor and for producing a second pulse train in response to the passage of said second edges past said sensor;
    a phase locked loop having a voltage controlled oscillator for producing a first signal having a frequency which is representative of but greater than the frequency of pulses in said first pulse train;
    a counter for producing an output count in response to said first signal, said count being representative of the relative angular position of said shaft; and
    means for resetting said counter in response to the occurrence of a pulse in said second pulse train which indicates the passage of said irregularly spaced one of said second edges past said sensor, thereby making said output count representative of the absolute angular position of said shaft.

7. A circuit as recited in claim 6, wherein:

the pulses of said first pulse train are of a first polarity; and the pulses of said second pulse train are of a second polarity.

8. A circuit as recited in claim 6, wherein said means for detecting comprises:

an analog comparator for comparing said second pulse train with a first predetermined voltage level and for producing a first logic signal in response to the occurrence of said irregularly spaced pulse.

9. A circuit as recited in claim 8, wherein said means for resetting comprises:

a digital comparator for comparing said output count with a preselected number and for producing a second logic signal when said output count equals said preselected number; and means for producing a reset signal in response to said first and second logic signals.

* * * * *